(12) United States Patent
Golovashkin et al.

(10) Patent No.: US 10,068,170 B2
(45) Date of Patent: Sep. 4, 2018

(54) MINIMIZING GLOBAL ERROR IN AN ARTIFICIAL NEURAL NETWORK

(71) Applicant: Oracle International Corporation, Redwood Shores, CA (US)

(72) Inventors: Dmitry Golovashkin, Belmont, CA (US); Patrick Aboyoun, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 956 days.

(21) Appl. No.: 14/492,440

(22) Filed: Sep. 22, 2014

(65) Prior Publication Data

US 2015/0088795 A1 Mar. 26, 2015

Related U.S. Application Data

(60) Provisional application No. 61/881,375, filed on Sep. 23, 2013.

(51) Int. Cl.
*G06N 3/08* (2006.01)
*G06N 3/04* (2006.01)

(52) U.S. Cl.
CPC ........ *G06N 3/08* (2013.01); *G06N 3/04* (2013.01)

(58) Field of Classification Search
None
See application file for complete search history.

(56) References Cited

U.S. PATENT DOCUMENTS

| 6,622,134 B1* | 9/2003 | Sorkin | G06F 21/56 706/12 |
| 2014/0143191 A1* | 5/2014 | Padovani | G06N 3/08 706/15 |
| 2014/0143194 A1* | 5/2014 | Yoon | G06N 3/08 706/25 |

(Continued)

OTHER PUBLICATIONS

Potočnik, Bošjan, et al. "Model-based predictive control of hybrid systems: a probabilistic neural-network approach to real-time control." Journal of Intelligent & Robotic Systems 51.1 (2008): 45-63.*

(Continued)

*Primary Examiner* — Stanley K. Hill
(74) *Attorney, Agent, or Firm* — Hickman Palermo Becker Bingham LLP (57) ABSTRACT

Computer systems, machine-implemented methods, and stored instructions are provided for minimizing an approximate global error in an artificial neural network that is configured to predict model outputs based at least in part on one or more model inputs. A model manager stores the artificial neural network model. The model manager may then minimize an approximate global error in the artificial neural network model at least in part by causing evaluation of a mixed integer linear program that determines weights between artificial neurons in the artificial neural network model. The mixed integer linear program accounts for piecewise linear activation functions for artificial neurons in the artificial neural network model. The mixed integer linear program comprises a functional expression of a difference between actual data and modeled data, and a set of one or more constraints that reference variables in the functional expression.

18 Claims, 4 Drawing Sheets

(56) References Cited

U.S. PATENT DOCUMENTS

2015/0095273 A1* 4/2015 Sarah ............... G06N 3/049
                                                    706/25
2015/0248607 A1* 9/2015 Sarah ............... G06N 3/04
                                                    706/25

OTHER PUBLICATIONS

Gumus, Alev Taskin, Ali Fuat Guneri, and Selcan Keles. "Supply chain network design using an integrated neuro-fuzzy and MILP approach: A comparative design study." Expert Systems with Applications 36.10 (2009): 12570-12577.*

Julian, Pedro, Alfredo Desages, and Osvaldo Agamennoni. "High-level canonical piecewise linear representation using a simplicial partition." IEEE Transactions on Circuits and Systems I: Fundamental Theory and Applications 46.4 (1999): 463-480.*

Allah, Abdul Kareem F. Hassan Fath, and Fadhil Khalaf. "Artificial Neural Network Implementation for Solving Linear Programming Models." Journal of Kufa for Mathematics and Computer vol. 2.1 (2014): 113-121.*

Roll, Jacob, Alberto Bemporad, and Lennart Ljung. "Identification of piecewise affine systems via mixed-integer programming." Automatica 40.1 (2004): 37-50.*

Tjeng, Vincent et al.; "Verifying Neural Networks with Mixed Integer Programming"; 2017; pp. 1-11. (Year: 2017).*

Wersing, Heiko et al.; "Dynamical Stability Conditions for Recurrent Neural Networks with Unsaturating Piecewise Linear Transfer Functions"; Neural Computation 13(8) (2001) 1811-1825. (Year: 2001).*

Watta, Paul B. et al.; "A Coupled Gradient Network Approach for Static and Temporal Mixed-Integer Optimization"; IEEE Transactions on Neural Networks, vol. 7, No. 3, 1996; pp. 578-593. (Year: 1996).*

Hikawa, Hiroomi; "A Digital Hardware Pulse-Mode Neuron With Piecewise Linear Activation Function"; IEEE Transactions on Neural Networks, vol. 14, No. 5, 2003; pp. 1028-1037. (Year: 2003).*

Wen, Chengtao et al.; "A max-piecewise-linear neural network for function approximation"; Elsevier; Neurocomputing 71 (2008) 843-852. (Year: 2008).*

Aimms, "Mixed Integer Programming Software for Optimization" Mixed Integer Programming, last accessed Sep. 16, 2014, 2 pages.

Androulakis, I.P. et al., "BB: A Global Optimization Method for General Constrained Nonconvex Problems", 1995, 27 pages.

Integer Programming, Chapter 9, Some Integer-Programming Models, pp. 272-319, dated 1971.

Jones, D.R., "Lipschitzian Optimization Without the Lipschitz Constant", Journal of Optimization Theory and Application vol. 79, No. 1, dated Oct. 1993, pp. 157-181.

Frontline Solvers, "Optimization Problem Types—MIP and CP Frontline System", Frontline Systems, last accessed Sep. 16, 2014, 2 pages.

Mixed Integer Programming, "Overview" dated Mar. 10, 1997, 3 pages.

J. Cole Smith et al., "A Tutorial Guide to Mixed-Integer Programming Models and Solution Techniques" Department of Industrial and Systems Engineering University of Florida, dated Mar. 26, 2007, 23 pages.

Martin Burger and Andreas Neubauer. Analysis of Tikhonov regularization for function approximation by neural networks. Neural Networks, 16, 2001, 17 pages.

G. Cybenko. Approximations by superpositions of a sigmoidal function. Technical Report CSRD-856, Center for Supercomputing Research and Development, University of Illinois, 1989, 12 pages.

Anders Krogh and John A. Hertz. A simple weight decay can improve generalization. In Advances in Neural Information Processing Systems 4, pp. 950-957. Morgan Kaufmann, 1992.

Rainer Storn and Kenneth Price. Differential evolution—a simple and efficient heuristic for global optimization over continuous spaces. J. of Global Optimization, 11(4): pp. 341-359, Dec. 1997.

Aspnes, James "Linear Programming", http://www.cs.yale.edu/homes/aspnes/pinewiki/LinearProgramming.html, dated Jun. 17, 2014, 5 pages.

Roll, Jacob, "Local and Piecewise Affine Approaches to System Identification", Department of Electrical Engineering Linkoping University, dated 2003, 274 pages.

* cited by examiner

STORE AN ARTIFICIAL NEURAL NETWORK MODEL THAT IS CONFIGURED TO PREDICT ONE OR MORE MODEL OUTPUTS BASED AT LEAST IN PART ON ONE OR MORE MODEL INPUTS
300

MINIMIZE AN APPROXIMATE GLOBAL ERROR IN THE ARTIFICIAL NEURAL NETWORK MODEL AT LEAST IN PART BY CAUSING EVALUATION OF A MIXED INTEGER LINEAR PROGRAM THAT DETERMINES ONE OR MORE WEIGHTS BETWEEN TWO OR MORE ARTIFICIAL NEURONS IN THE ARTIFICIAL NEURAL NETWORK MODEL
302

MINIMIZING GLOBAL ERROR IN AN ARTIFICIAL NEURAL NETWORK

FIELD OF THE INVENTION

The present invention relates to determining weights for paths between artificial neurons in an artificial neural network.

BACKGROUND

Artificial Neural Networks

Artificial neural networks are model(s) that are built to predict unknown data, and are based on systems of interconnected neurons or nodes. A neural network contains three types of nodes, node(s) at an input layer that pass data into the model as model input(s) to other node(s) as node input(s), node(s) at hidden or intermediate layer(s) that compute values from their node input(s) and generate node output(s) that are either passed to other node(s) as node input(s) or passed to output node(s), and output node(s) that pass data out of the model from other node(s) as model output(s). Artificial neural networks may have any number of input nodes, any number of intermediate layers, each having any number of nodes, and any number of output nodes.

Artificial neural networks are generally capable of approximating non-linear functions of their inputs. Any node in the ANN may be modified by an activation function that changes the input to produce an output. Each input and output to each node in the network may further be adjusted by adaptive weights, which are parameters that may be adjusted by a learning process. For example, each intermediate and output node may have a corresponding activation function and weight that together specify how to modify input to the node into an output from the node.

Neural networks are further discussed in Martin Burger and Andreas Neubauer. *Analysis of Tikhonov regularization for function approximation by neural networks. Neural Networks,* 16, 2001, the entire contents of which are incorporated by reference herein; Simon Haykin. *Neural Networks and Learning Machines.* Prentice Hall, 3 edition, 2008, the entire contents of which are incorporated by reference herein; Anders Krogh and John A. Hertz. *A simple weight decay can improve generalization. In Advances in Neural Information Processing Systems* 4, pages 950-957. Morgan Kaufmann, 1992, the entire contents of which are incorporated by reference herein; and R. D. Reed and II Dr. Robert J Marks. *Neural Smithing: Supervised Learning in Feedforward Artificial Neural Networks.* Bradford Bks. MIT, 1999, the entire contents of which are incorporated by reference herein;

Mixed Integer Programs

A mixed-integer linear program (MIP) is a linear integer program for which some, but not all, variables are restricted to be integers, and is a pure integer program when all decision variables must be integers. MIPs are further described in Bradley, Stephen P., Hax, Arnoldo C., and Magnanti, Thomas L., *Applied Mathematical Programming,* Addison-Wesley Pub. Co., 1977. In particular, Chapter 9 describes *Integer Programming* and is available online at web.mit.edu/15.053/www/AMP-Chapter-09.pdf. The entire contents of Chapter 9 are incorporated by reference herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Figure 3:
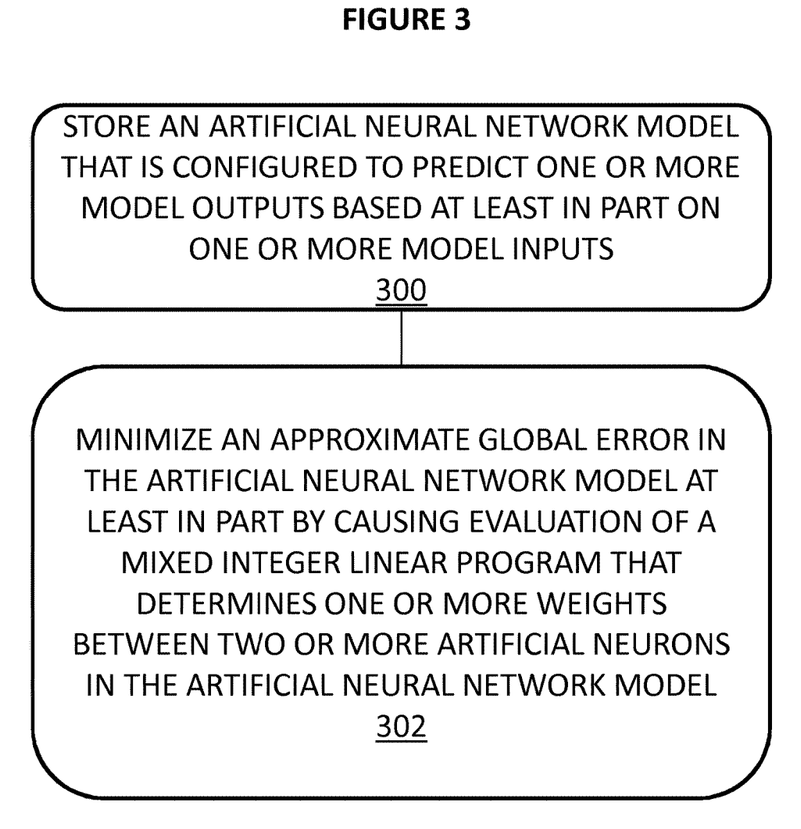
FIG. 3 illustrates an example process for minimizing an approximate global error in an artificial neural network.

Computer systems, machine-implemented methods, and stored instructions are provided herein for minimizing an approximate global error in an artificial neural network. The approximate global error is a quantified difference between the predicted output from the neural network model and the observed output or a sample thereof. In one embodiment, with reference to FIG. 3, in step 300, one or more computing devices store an artificial neural network model that is configured to predict one or more model outputs based at least in part on one or more model inputs. The neural network model comprises an input layer, one or more intermediate layers, and an output layer. In step 302, the one or more computing devices may then minimize an approximate global error in the artificial neural network model at least in part by causing evaluation of a mixed integer linear program that determines one or more weights between two or more artificial neurons in the artificial neural network model. The mixed integer linear program accounts for one or more piecewise linear activation functions for one or more artificial neurons in the artificial neural network model.

For example, the one or more computing devices may operate a model manager, comprising stored instructions operating on the one or more computing devices to store the artificial neural network model and modify the artificial neural network model to minimize approximate global error. The instructions may be stored on one or more storage devices, and the instructions may be operable to, when executed, cause hardware such as one or more storage devices and one or more processors to perform the storage and modification steps.

In one embodiment, the mixed integer linear program comprises a functional expression of a difference between actual data and modeled data, and a set of one or more constraints that reference two or more variables in the functional expression. In this embodiment, minimizing the functional expression minimizes the difference between the actual observed data and the modeled data.

A neural network is a class of operations that are used for multiple applications in pharmaceuticals, finance, and other industries. The neural network processes model input data and approximates as accurately as possible the outputs.

During a training phase, the neural network is trained to process model input values to be as close as possible to known output values. Whenever you input new information, the neural network is configured to predict, as close as possible, unknown output.

The neural network is made up of parameters that are fine-tuned during the training phase and that generally remain fixed during the prediction phase.

Training the neural network includes minimizing an error function that calculates an error between what the neural network predicted and the values that were actually observed. The error may be a differentiable function, but the error function may have several local minima. As a result, the local error may be difficult or even impossible to solve to global optimality.

A gradient approach includes randomly starting and restarting with parameter values in the model, and following the gradient towards local optimality. The gradient approach finds a local minimum when the derivative of the error function reaches zero by moving away from a starting point along the gradient. The best local optimum is used as the guessed global minimum, but the gradient approach is not capable of computing the global minimum of the error. The approach is only capable of finding and comparing several local minima.

Mixed integer models can be solved to global optimality.

A sigmoid function is a step function that is continuous and differentiable, and the sigmoid function is often used to approximate real-world values. Instead of using the sigmoid function, a model manager may use a piecewise linear function. If sigmoid functions already existed as activation functions, the sigmoid functions may be approximated using the piecewise linear functions.

The neural network can then be reformulated using mixed integer linear programming and solved to global optimality. The mixed integer linear optimization provides a provably global solution rather than a non-global solution that is produced by non-linear optimization techniques.

In one embodiment, the model manager starts with a complex nonlinear model that is not solvable to global optimality, and the model manager approximates the complex nonlinear model to a piecewise linear model that can be solved to global optimality.

Artificial neural network (ANN) are usually formulated as non-convex differentiable unconstrained nonlinear optimization problems, which pose a significant challenge to solve to global optimality. The model manager described herein may perform Mixed-Integer Programming (MIP) based transformations and computations to global optimality over $L \Leftarrow w \Leftarrow U$ bound box constraints for synaptic weights. Global optimization is further discussed in Rainer Storn and Kenneth Price. *Differential evolution—a simple and efficient heuristic for global optimization over continuous spaces. J. of Global Optimization*, 11(4):341-359, December 1997, the entire contents of which are incorporated by reference herein.

Unlike other modeling techniques, the model manager may (1) provide a guarantee of global optimality, and/or (2) remove the need for numerous restarts. The model manager solves just one model rather than guessing at many different local solutions based on many different start points.

An artificial neural network (ANN) can be viewed as a mapping, capable to learn intricate nonlinear relationships between input and target data sets. ANN can be represented as a weighted, directed graph, whose nodes—artificial neurons—are often grouped into layers. ANNs are usually formulated as non-convex differentiable unconstrained nonlinear optimization problems, which pose a significant challenge to solve to global optimality. Techniques described herein use several MIP-based processes, which directly determine global optimality over $w_L \le w \le w_U$ bound box constraints for synaptic weights, rather than indirectly determining global optimality using a guess-and-check method based on local optimality.

In one embodiment, the model manager generates traditional feed-forward neural network models with input, output, and H hidden layers. L≡H+1 will denote the total number of layers, counting all hidden ones and the output. If the input is counted as a separate layer, then L≡H+2. For convenience and brevity considerations, as used herein, superscripts refer to layers, and subscripts to individual neurons.

In one example, the model manager is given a matrix of input X and target T data, where $X \in \mathbb{R}^{m \times p}$ and $T \in \mathbb{R}^{m \times q}$, and reserve lower case $x_r$ and $t_r$ to denote r-th row of X and T correspondingly.

In the example, $N^l$ denotes a set of neurons of the l-th layer, $\varphi_i^l$ denote an activation function of the i-th neuron of the l-th layer, $i \in N^l$. $\varphi_i^l$ is a function of this unit's bias $w_i^l$, previous layer's outputs $y_{rj}^{l-1}$ (for a specific $x_r$), $j \in N^{l-1}$, and corresponding weights $w_{ji}^l$:

$$y_{ri}^l = \varphi_i^l \left( \sum_{j \in N^{l-1}} y_{rj}^{l-1} w_{ji}^l + w_i^l \right) \tag{1}$$

In other words, $w_{ji}^l$ denotes a connection weight from the j-th neuron of the previous (l−1)-th layer into the i-th neuron of the l-th layer. For the first hidden layer (l=1), its activation functions' inputs $y_{rj}^0$ become input data $x_{rj}$, the r-th input matrix row $y_{rj}^0 \equiv x_{rj}$; while $y_{ri}^L$, $i \in N^L$ are model's outputs, where L≡H+1 is, again, the total number of layers in the model.

By considering a standard least squares error function $$E(w) \equiv \frac{1}{2} \sum_r \sum_{i \in N^L} (y_{ri}^L - t_{ri})^2 \tag{2}$$

the model manager may train the neural network using an unconstrained nonlinear optimization problem:

$$\min_w E(w) \tag{3}$$

where w is the vector of all synaptic weights in the model, and $t_r$ is the vector of targets.

Several classes of activation functions φ are used in practice, e.g. logistic and bipolar sigmoid:

$$\varphi(x) = \frac{1}{1+e^{-x}} \quad (4)$$

$$\varphi(x) = \frac{1-e^{-x}}{1+e^{-x}} \quad (5)$$

Based on their second derivatives, they are non-convex. In fact, non-convexity may be a characteristic of all bounded, not necessarily differentiable, activation functions. Convex analysis is further discussed in Ralph Tyrrell Rockafellar. *Convex Analysis*. Princeton University Press, 1970, the entire contents of which are incorporated by reference herein.

In one embodiment, the neural network is built based on one subset of a body of observed data, and the neural network is tested or trained against a second, different subset of the body of observed data. The different subsets of data may be determined randomly to increase a likelihood that the neural network will be valid for unknown data that may be observed in the future.

Modifying Activation Functions

In one embodiment, the one or more computing devices replace, in the artificial neural network model, at least one non-linear activation function with at least one piecewise linear step function.

In one embodiment, the one or more computing devices replace, in the artificial neural network model, at least one non-linear activation function with at least one continuous piecewise linear function.

In one embodiment, the one or more computing devices replace, in the artificial neural network model, at least one non-linear activation function with at least one piecewise linear function that includes three or more segments.

In one embodiment, the one or more computing devices replace, in the artificial neural network model, all of a plurality of non-linear activation functions with corresponding piecewise linear functions that approximate the non-linear activation functions.

In one embodiment, the one or more computing devices replace, in the artificial neural network model, one or more sigmoid activation functions with one or more step functions.

Various MIP examples may include piecewise discontinuous activation functions. MIP problems may be solved to global optimality using a branch-and-bound technique. Also, the process of solving an MIP may include a pre-processing phase (variable and constraint elimination, scaling, tightening, substitutions), automatic cutting plane generation, dynamic cut pools, and so forth. These additional techniques may make solving a large-scale MIP practical and efficient, even with limited computing resources.

Smooth activation functions such as logistic sigmoid (4) may be popular in part due to their suitability for the gradient descent algorithm and its higher-order extensions. However, for any bounded non-constant activation function $\varphi$ the standard multi-layer feed-forward network can approximate any $L^p(\mu)$ function $f(\cdot)$:

$$(\int_S |f|^p d\mu)^{1/p} < \infty$$

The approximation is discussed further in Kurt Hornik. *Approximation capabilities of feedforward neural networks. Neural Networks*, 4(2):251-257, 1991, the entire contents of which are incorporated by reference herein; and Kurt Hornik, Maxwell B. Stinchcombe, and Halbert White. *Multilayer feedforward networks are universal approximators. Neural Networks*, 2(5):359-366, 1989, the entire contents of which are incorporated by reference herein. Approximations are also discussed in G. Cybenko. *Approximations by superpositions of a sigmoidal function*. Technical Report CSRD-856, Center for Supercomputing Research and Development, University of Illinois, 1989, the entire contents of which are incorporated by reference herein.

Taking the above observation into account, an arbitrary staircase step function is considered for activation of the hidden neurons:

$$\varphi(z) = \begin{cases} h_1, & \text{if } z_1 \le z \le z_2 \\ h_2, & \text{if } z_2 < z \le z_3 \\ h_3, & \text{if } z_3 < z \le z_4 \\ \dots & \dots \\ h_n, & \text{if } z_n < z \le z_{n+1} \end{cases} \quad (6)$$

where $$h_1 < h_2 < \dots < h_n,$$

and $$z_1 < z_2 < \dots < z_{n+1}.$$

For the output layer activation, in addition to (6), the model manager may consider any piece-wise linear activation functions.

Figure 4:
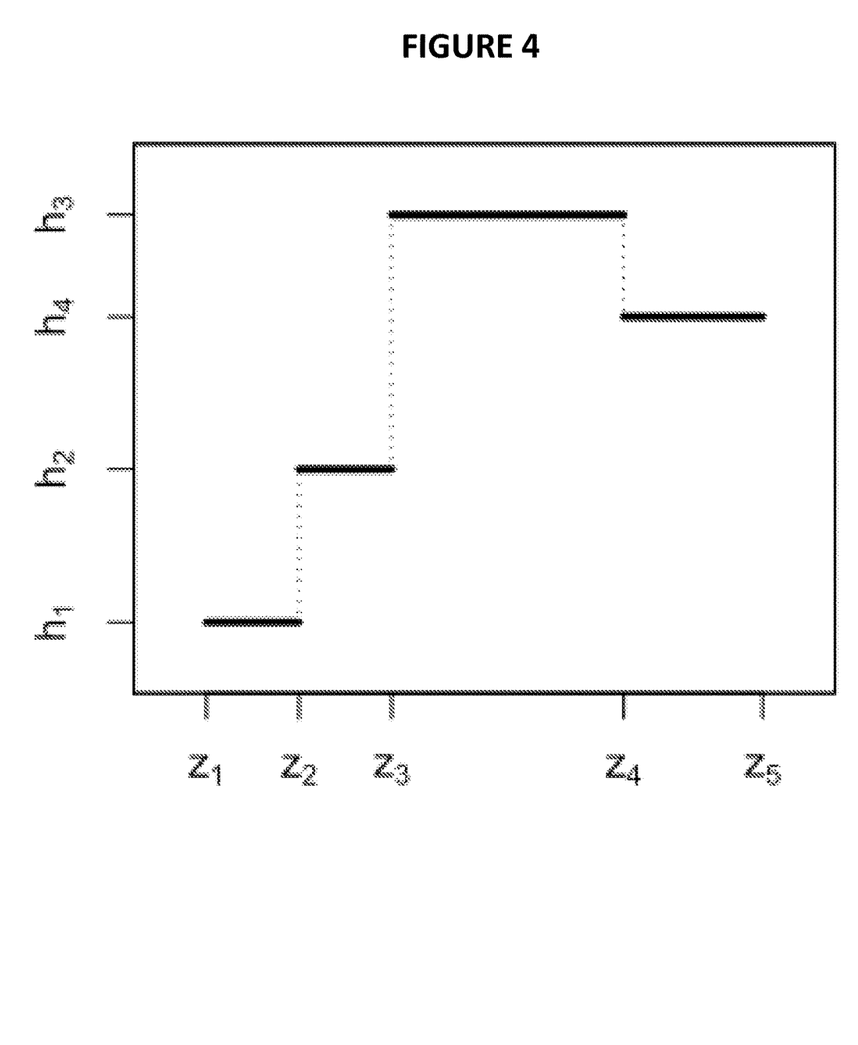
FIG. 4 shows an example staircase step function that could represent an activation function of an artificial neural network.

Note, from MIP formulation perspective, activation function definition at points of discontinuity (lower or upper semi-continuity) is immaterial, the model manager implementing the MIP optimization will pick whichever value is optimal for the model. The shape of the activation functions is explained by the goal of keeping the resultant mixed-integer models linear as versus quadratic/nonlinear, due to availability of robust MIP solvers capable to solve large-scale linear models. As the first step of mixed-integer linearization, the model manager reformulates unconstrained minimization (2), into an equivalent constrained nonlinear optimization problem:

FIG. 4 shows an example staircase step function that could represent an activation function. As shown, h1, h2, h3, and h4 represent different output values of the function, and z1, z2, z3, z4, and z5 represent different input values to the function. The function is provided below:

$$\min_{w,y,z} \frac{1}{2} \sum_r \sum_{i \in \mathcal{N}^L} (y_{ri}^L - t_{ri})^2 \quad (7)$$

Subject to:

$$y_{ri}^L = \varphi_i^L(z_{ri}^L) \quad \forall r, \forall i \in \mathcal{N}^L$$

$$z_{ri}^L = \sum_{j \in \mathcal{N}^{L-1}} y_{rj}^{L-1} w_{ji}^L + w_i^H \quad \forall r, \forall i \in \mathcal{N}^L$$

$$y_{ri}^{L-1} = \varphi_i^{L-1}(z_{ri}^{L-1}) \quad \forall r, \forall i \in \mathcal{N}^{L-1}$$

$$z_{ri}^{L-1} = \sum_{j \in \mathcal{N}^{L-2}} y_{rj}^{L-2} w_{ji}^{L-1} + w_i^{L-1} \quad \forall r, \forall i \in \mathcal{N}^{L-1}$$

$$\dots$$

$$y_{ri}^1 = \varphi_i^1(z_{ri}^1) \quad \forall r, \forall i \in \mathcal{N}^1$$

$$z_{ri}^1 = \sum_{j \in \mathcal{N}^0} x_j w_{ji}^1 + w_i^1 \quad \forall r, \forall i \in \mathcal{N}^1$$

where each $y_{ri}^l$ is now an independent variable, $z_{ri}^l$ denotes input into the i-th activation function of the l-th layer. z are auxiliary variables, introduced to facilitate linear formulation.

There are three types of nonlinear terms that may appear in the model:
1. Nonlinear activation $\varphi(\cdot)$,
2. Bilinear terms $y_{rj}^{l-1} w_{ji}^l$,
3. Quadratic objective (minimization of quadratic terms).

By introducing new binary variables, the model manager can transform constrained nonlinear optimization problem (7) into a mixed-integer linear model over the bound box constraints for synaptic weights.

For example, the model manager may consider the activation (6). The example is simplified by dropping layer, neuron, and row indices. The model manager may model the staircase step function $y=\varphi(z)$ by introducing new binary $d_i$ and continuous $\xi_i$ variables:

$$y = h_1 d_1 + h_2 d_2 + \ldots + h_n d_n \quad (8)$$
$$z = z_1 d_1 + (z_2 - z_1)\xi_1 + + z_2 d_2 +$$
$$(z_3 - z_2)\xi_2 + \ldots + + z_n d_n + (z_{n+1} - z_n)\xi_n$$
$$d_1 + d_2 + \ldots + d_n = 1$$
$$d_i \in \{0, 1\}, \forall i = 1, \ldots, n$$
$$0 \leq \xi_i \leq d_i, \forall i = 1, \ldots, n$$

where $d_i=1$ means that the i-th segment $z_i < z \leq z_{i+1}$ was chosen. Note that for (8) and all following MIP problems, the model manager may assume that lower and upper bounds can be established on all z variables. And, indeed, they can be derived assuming the bounds on connection weights w are given, and by taking into account the boundedness $h_1 \leq y(z) \leq h_{n+1}$ of the staircase activation function. The model manager may also assume that $z_1 \leq z_L$, and $z_U \leq z_{n+1}$, which may be ensured by adjusting $z_1$ and $z_{n+1}$ if necessary in a particular example.

In a particular example of the (8) transformation, a unit step function may be represented as:

$$\varphi(z) = \begin{cases} 0, & z \leq 0 \\ 1, & z > 0 \end{cases} \quad (9)$$

Assuming that z components are bounded within $z_L \leq z \leq z_U$ (where $z_L < 0$ and $z_U > 0$), the model manager may immediately arrive at the following MIP representation for $y=\varphi(z)$:

$$y = d$$
$$z = z_L(1-d) - v_L \xi_1 + z_U \xi_2$$
$$0 \leq \xi_1 \leq 1-d$$
$$0 \leq \xi_2 \leq d$$
$$d \in \{0,1\} \quad (10)$$

In a similar fashion, the model manager may construct an MIP representation for the bipolar step function:

$$\varphi(z) = \begin{cases} -1, & z \leq 0 \\ 1, & z > 0 \end{cases} \quad (11)$$

$$y = 2d - 1 \quad (12)$$
$$z = z_L(1-d) - z_L \xi_1 + z_U \xi_2$$
$$0 \leq \xi_1 \leq 1-d$$
$$0 \leq \xi_2 \leq d$$
$$d \in \{0, 1\}$$

Since each y is either a binary or a linear combination of binary variables, to represent the bilinear term wy, or $w(h_1 d_1 + h_2 d_2 + \ldots + h_n d_n)$ as a mixed-integer linear program, it suffices to show how to transform wd where $d \in \{0, 1\}$ is binary. The model manager may use an MIP modeling trick as follows. For each bilinear term, the model manager introduces one continuous variable q and two additional linear constraints:

$$Ld \leq q \leq Ud$$
$$L(1-d) \leq w-q \leq U(1-d) \quad (13)$$

where L and U are lower and upper bounds on w: $L \leq w \leq U$. Now each bilinear term wd in the original constrained formulation (7) can be replaced by an equivalent linear q.

Finally, the model manager may reformulate the objective function by switching to $L_\infty$ norm:

$$\min f$$
$$f \geq y_i^L - t_i, \forall i \in N^L$$
$$f \geq t_i - y_i^L, \forall i \in N^L \quad (14)$$

If the output layer neurons have no out-edges, then the output activation functions can be arbitrary piece-wise linear, and can be readily modeled by a Specially Ordered Set of Type 2 (SOS2), a facility which may be supported by modern MIP software. Modern MIP software is further discussed in J. A. Tomlin. *Special ordered sets and an application to gas supply operations planning. Mathematical Programming*, 42:69-84, April 1988, the entire contents of which are incorporated by reference herein.

Accordingly, the model manager may use staircase step functions for both hidden and output neurons, and arbitrary continuous piece-wise linear functions for the output neurons. The model manager may transform nonlinear step function based ANNs formulations into equivalent mixed-integer linear models. The mixed-integer models can be solved to global optimality by modern MIP solvers, thus eliminating a weakness of many neural network models: Local optima.

No Need to Determine Gradient

In one embodiment, the mixed integer linear program determines the one or more weights directly without using a gradient approach, wherein the gradient approach, if used, would minimize local error in the artificial neural network model by iteratively improving the one or more weights.

In one embodiment, the one or more piecewise linear activation functions are non-differentiable and non-usable with an alternative gradient approach that, if used, would minimize local error in the artificial neural network model by iteratively improving the one or more weights. The gradient approach attempts to find as many local minima as possible using random restarts. The gradient approach may use a predetermined number of random restarts, for a predetermined amount of time, or may try random restarts until the local minimum stops improving. Even if the local minimum has stopped improving according to the gradient approach, the gradient approach cannot guarantee that the best local minimum has been explored. For example, the minimum global error may lie on another point that was not used as or sufficiently near a starting point for the gradient approach. Accordingly, the minimum global error would exist apart from the guess provided by the gradient approach.

Rather than determining exact local minima of a nonlinear differentiable problem, as is done by the gradient approach using random starting points, the techniques described herein determine an approximate global minimum based on piecewise linear functions that approximate the activation functions in the model. The approximate global minimum may then be plugged back in as a starting point using the gradient approach to find an exact global minimum and/or be used to check an initial result provided by the gradient approach. In one embodiment, the nonlinear differentiable problem is an approximation of piecewise linear relationships in the modeled environment, and the model using the piecewise linear relationships better approximates the observed values than the model using the nonlinear differentiable relationships.

Minimizing Approximate Global Error

In one embodiment, the one or more computing devices cause evaluation of the mixed integer linear program at least in part by branching a candidate set of weights into candidate sub-sets of weights and determining upper and lower bounds for the approximate global error using the candidate sub-sets of weights.

In one embodiment, the one or more computing devices cause evaluation of the mixed integer linear program at least in part by using one or more of a branch and cut technique, a cutting plane technique, a branch and price technique, a branch and bound technique, such as the alpha branch and bound ("alphaBB") technique developed by Professor Floudas, or a Lipschitzian optimization technique. The alphaBB technique is further described in "alphaBB: A Global Optimization Method for General Constrained Nonconvex Problems," by I. P. Androulakis, C. D. Maranas, C. A. Floudas (1995), the entire contents of which is incorporated by reference herein. The Lipschitzian optimization technique is further described in "Lipschitzian Optimization Without the Lipschitz Constant," by D. R. Jones, C. D. Perttunen, and B. E. Stuckman, communicated by L. C. W. Dixon, the entire contents of which is incorporated by reference herein.

In one example, the model manager maintains a branching tree structure to solve a MIP. The model manager builds the branching tree structure by starting with a choice of integer variables that fits within the model and solves the model for the integer variables. The model manager then changes or branches over the integer variables to solve over another combination of integer variables. Each combination of integer variables and corresponding solution is maintained in the branching tree structure. The branching tree structure is then used to determine, based on all boundary combinations represented in the linear activation functions of the model, the global minimum of error for the model.

In one example, one or more activation functions may be piecewise step functions that change at $x=1$, $x=3$, and $x=6$. Based on this activation function, the model manager may select boundaries that are less than 1, at or near 1, between 1 and 3, at or near 3, between 3 and 6, at or near 6, and greater than 6. In the example, these different values may be used to determine which point is the global minimum of the error function, without the need to evaluate all points that fall within the MIP.

Using the Artificial Neural Network to Predict Unknown Outputs

In one embodiment, the one or more computing devices create the artificial neural network model based on known inputs. After minimizing the approximate global error in the artificial neural network model, the one or more computing devices may use the artificial neural network model to predict one or more unknown outputs based at least in part on one or more known inputs.

XOR Example

Exclusive-OR (XOR) is a logical operation, which can be described by the following truth table. The input data has four observations, two inputs (A and B), and one target. The XOR operation may be modeled to minimize global error according to techniques described herein.

TABLE 1

XOR truth table

| Input A | Input B | Output XOR |
|---------|---------|------------|
| 0 | 0 | 0 |
| 0 | 1 | 1 |
| 1 | 0 | 1 |
| 1 | 1 | 0 |

For example, the neural network may be constructed using two hidden neurons (see FIG. 2) with unit step activation functions, and a linear activation function for the output neuron.

Figure 2:
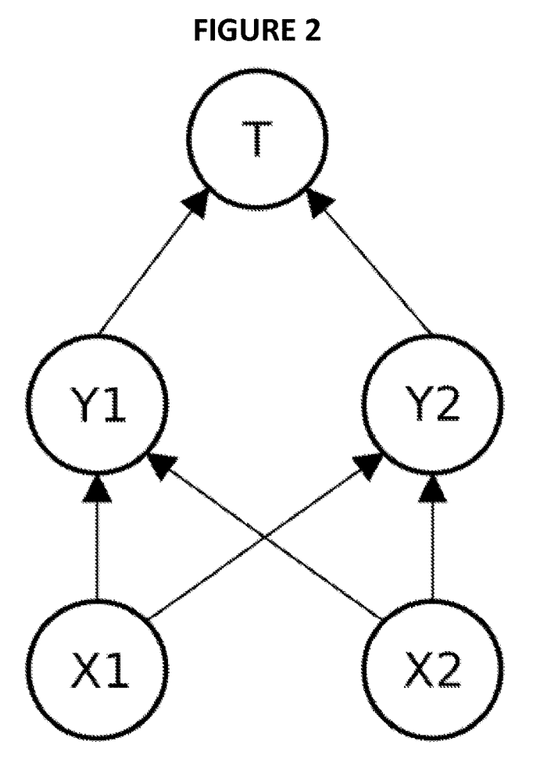
FIG. 2 illustrates an example neural network having example inputs X1 and X2, an example hidden layer of Y1 and Y2, and an example output of T.

FIG. 2 shows an example neural network with two hidden neurons, Y1 and Y2. According to the neural network of FIG. 2, the classical (differentiable) formulation of this model with least-squares objective is known to have several local minima, including $f^*=0.25$, $f^*=0$, and $f^*=0.3333$. In the example, $f^*$ is the objective/error function value at the corresponding local minimizer. The model may be determined according to the techniques described herein to find $f^*=0$, which is clearly the global minimum. However, depending upon starting point, gradient-based algorithms may converge to either $f^*=0.25$ or $f^*=0.3333$, and thereby misclassify two or three observations out of four.

The techniques described herein may use mixed integer programming (MIP) to find $f^*=0$ regardless the starting point.

To simplify the formulation, the model manager may operate based on an initial assumption that all weights have the same lower and upper bounds $L \leq w \leq U$. For instance $L=-1000$ and $U=1000$. Each of the weights corresponds to one of the neurons. The weight is used to modify an output produced by an activation function for the neuron, such as a step function that approximates a sigmoid function. The input may be received from a hidden neuron or received as input to the model. The output may be provided to a hidden neuron or provided as output from the model. In the example, there is one hidden layer; in other examples, there may be multiple hidden layers.

An error function for the neural network model may be minimized by adjusting the weights such that the modeled output best matches the observed outputs for observed inputs. In other words, the distance between target values (observed outputs) and predicted values (modeled outputs) is minimized.

For the XOR problem, let X denote the matrix of input observations and T denote the vector of targets:

$$X = \begin{bmatrix} 0 & 0 \\ 0 & 1 \\ 1 & 0 \\ 1 & 1 \end{bmatrix}$$

$$T = \begin{bmatrix} 0 \\ 1 \\ 1 \\ 0 \end{bmatrix}$$

An example corresponding MIP model is as follows:

$$\min f \quad \forall r, \forall i$$

$$f \geq q_{ri} - t_r \quad \forall r, \forall i$$

$$f \geq t_r - q_{ri} \quad \forall r, \forall i$$

$$\sum_{j \in N^0} x_{rj} w_{ji}^1 + w_i^1 = z_{Lri}(1 - d_{ri} - \xi_{1ri}) + z_{Uri} \xi_{2ri} \xi_{2ri} \quad \forall r, \forall i$$

$$Ld_{ri} \leq q_{ri} \leq Ud_{ri} \quad \forall r, \forall i$$

$$L(1 - d_{ri}) \leq w_{ri}^2 - q_{ri} \leq U(1 - d_{ri}) \quad \forall r, \forall i$$

$$0 \leq \xi_{1ri} \leq 1 - d_{ri} \quad \forall r, \forall i$$

$$L \leq q_{ri} \leq U \quad \forall r, \forall i$$

$$d_{ri} \in \{0, 1\} \quad \forall r, \forall i$$

where $r \in \{1, 2, 3, 4\}$ the set of row indices of the input matrix X, $i \in \{1, 2\}$ is the index set of the hidden neurons. $N^0 = \{1, 2\}$ is the set of input nodes.

Lower $z_{Lri}$ and upper $z_{Uri}$ bounds on the inputs into the hidden neurons are pre-computed by taking weight bounds into the account. Indeed, for the first observation and the first hidden neuron:

$$z_{11} = 0w_{11}^1 + 0w_{21}^1 + w_1^1$$

therefore $z_{L11} = L$, and $z_{U11} = U$. The model manager may solve the above MIP to arrive at the desired $f^* = 0$. Unlike the gradient approach, the MIP solution explores all possible branches of the problem and arrives at the globally best solution to the problem, rather than guessing and checking for locally best solutions in different regions of solutions to the problem.

Extensions and Alternatives

In one embodiment, the model manager initially creates the neural network model by selecting one or a few neurons, solves the error function to global optimality, and increases a number of neurons in the model until the error function either stops improving, improves below a threshold amount, or until an amount of time has passed or otherwise a threshold amount of computing resources have been consumed.

In one embodiment, before determining whether to use MIP or the gradient technique to minimize global error in an ANN, the model manager determines how many activation functions or artificial neurons are involved in the ANN. In one example, if there are less than 1 million artificial neurons, the model manager selects to use MIP to minimize global error. Conversely, if there are 1 million or more artificial neurons, the model manager selects to use the gradient technique to determine a best local minimum error from among a discrete number of local minimum errors based on a discrete number of starting points to the gradient technique.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 1:
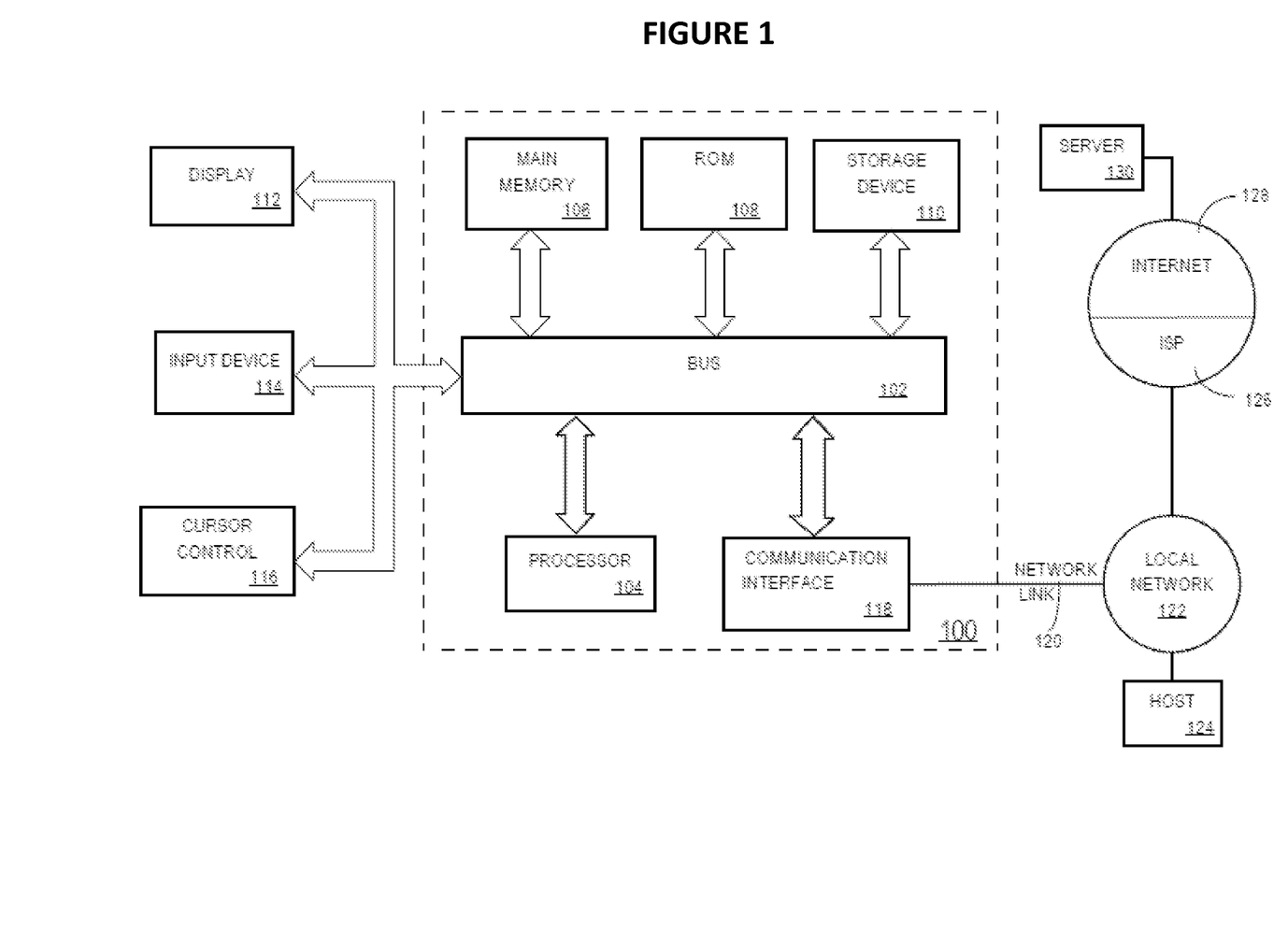
FIG. 1 illustrates an example computer system configured to execute stored instructions for implementing various techniques described herein.

For example, FIG. 1 is a block diagram that illustrates a computer system 100 upon which an embodiment of the invention may be implemented. Computer system 100 includes a bus 102 or other communication mechanism for communicating information, and a hardware processor 104 coupled with bus 102 for processing information. Hardware processor 104 may be, for example, a general purpose microprocessor.

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or solid-state drive is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 may implement the techniques described herein using customized hard-wired logic, one or more ASICs or FPGAs, firmware and/or program logic which in combination with the computer system causes or programs computer system 100 to be a special-purpose machine. According to one embodiment, the techniques herein are performed by computer system 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid-state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing an artificial neural network model that is configured to predict one or more outputs based at least in part on one or more inputs, wherein the artificial neural network model comprises an input layer, one or more intermediate layers, and an output layer; and
   minimizing a global error in the artificial neural network model at least in part by solving a mixed integer linear program that directly determines, without performing a gradient descent, one or more weights between two or more artificial neurons in the artificial neural network model, wherein:
      the mixed integer linear program comprises one or more piecewise linear activation functions for one or more artificial neurons in the artificial neural network model, and
      said directly determines said one or more weights comprises branching a candidate set of weights into candidate sub-sets of weights and determining upper and lower bounds for said global error based on the candidate sub-sets of weights;
   configuring the artificial neural network model based on the one or more weights;
   wherein the method is performed by one or more computing devices.

2. The method of claim 1, further comprising replacing, in the artificial neural network model, at least one non-linear activation function with at least one piecewise linear step function.

3. The method of claim 1, further comprising replacing, in the artificial neural network model, at least one non-linear activation function with at least one continuous piecewise linear function.

4. The method of claim 1, further comprising replacing, in the artificial neural network model, at least one non-linear activation function with at least one piecewise linear function that includes three or more segments.

5. The method of claim 1, further comprising replacing, in the artificial neural network model, all of a plurality of non-linear activation functions with corresponding piecewise linear functions that approximate the non-linear activation functions.

6. The method of claim 1, further comprising:
creating the artificial neural network model based on known outputs, and
after minimizing the global error in the artificial neural network model, using the artificial neural network model to predict one or more unknown outputs based at least in part on one or more known inputs.

7. The method of claim 1, wherein the one or more piecewise linear activation functions are non-differentiable and non-usable with an alternative gradient approach that, if used, would minimize local error in the artificial neural network model by iteratively improving the one or more weights.

8. The method of claim 1, wherein solving the mixed integer linear program comprises using one or more of a branch and cut technique, a cutting plane technique, a branch and price technique, a branch and bound technique, or a Lipschitzian optimization technique.

9. The method of claim 1, wherein the mixed integer linear program comprises a functional expression of a difference between actual data and modeled data, and a set of one or more constraints that reference two or more variables in the functional expression.

10. One or more non-transitory computer-readable media storing instructions which, when executed by one or more processors, cause:
storing an artificial neural network model that is configured to predict one or more outputs based at least in part on one or more inputs, wherein the artificial neural network model comprises an input layer, one or more intermediate layers, and an output layer; and
minimizing a global error in the artificial neural network model at least in part by solving a mixed integer linear program that directly determines, without performing a gradient descent, one or more weights between two or more artificial neurons in the artificial neural network model, wherein:
the mixed integer linear program comprises one or more piecewise linear activation functions for one or more artificial neurons in the artificial neural network model, and
said directly determines said one or more weights comprises branching a candidate set of weights into candidate sub-sets of weights and determining upper and lower bounds for said global error based on the candidate sub-sets of weights;
configuring the artificial neural network model based on the one or more weights.

11. The one or more non-transitory computer-readable media of claim 10, the instructions further comprising instructions for replacing, in the artificial neural network model, at least one non-linear activation function with at least one piecewise linear step function.

12. The one or more non-transitory computer-readable media of claim 10, the instructions further comprising instructions for replacing, in the artificial neural network model, at least one non-linear activation function with at least one continuous piecewise linear function.

13. The one or more non-transitory computer-readable media of claim 10, the instructions further comprising instructions for replacing, in the artificial neural network model, at least one non-linear activation function with at least one piecewise linear function that includes three or more segments.

14. The one or more non-transitory computer-readable media of claim 10, the instructions further comprising instructions for replacing, in the artificial neural network model, all of a plurality of non-linear activation functions with corresponding piecewise linear functions that approximate the non-linear activation functions.

15. The one or more non-transitory computer-readable media of claim 10, the instructions further comprising instructions for:
creating the artificial neural network model based on known outputs, and
after minimizing the global error in the artificial neural network model, using the artificial neural network model to predict one or more unknown outputs based at least in part on one or more known inputs.

16. The one or more non-transitory computer-readable media of claim 10, wherein the one or more piecewise linear activation functions are non-differentiable and non-usable with an alternative gradient approach that, if used, would minimize local error in the artificial neural network model by iteratively improving the one or more weights.

17. The one or more non-transitory computer-readable media of claim 10, wherein solving the mixed integer linear program comprises using one or more of a branch and cut technique, a cutting plane technique, a branch and price technique, a branch and bound technique, or a Lipschitzian optimization technique.

18. The one or more non-transitory computer-readable media of claim 10, wherein the mixed integer linear program comprises a functional expression of a difference between actual data and modeled data, and a set of one or more constraints that reference two or more variables in the functional expression.

* * * * *

UNITED STATES PATENT AND TRADEMARK OFFICE
CERTIFICATE OF CORRECTION

PATENT NO. : 10,068,170 B2  
APPLICATION NO. : 14/492440  
DATED : September 4, 2018  
INVENTOR(S) : Golovashkin et al.

Page 1 of 1

It is certified that error appears in the above-identified patent and that said Letters Patent is hereby corrected as shown below:

On the Title Page

Column 1, item (56), under Other Publications, Line 1, delete "Bošjan," and insert -- Boštjan, --, therefor.

In the Specification

In Column 1, Line 44, delete "3" and insert -- $3^{rd}$ --, therefor.

In Column 1, Line 54, delete "herein;" and insert -- herein. --, therefor.

In Column 5, Line 55, after "Smooth" insert -- $C^{\infty}$ --.

In Column 11, Line 26, delete "$\int_{j \in N0} x_{rj} w_{ji}^1 + w_i^1 = z_{Lri}(1 - d_{ri} - \xi_{1ri}) + z_{Uri}\xi_{2ri}\xi_{2ri}$" and insert -- $\Sigma_{j \in N0} x_{rj} w_{ji}^1 + w_i^1 = z_{Lri}(1 - d_{ri} - \xi_{1ri}) + z_{Uri}\xi_{2ri}$ --, therefor.

In Column 11, Line 32, Below "$0 \leq \xi_{1ri} \leq 1 - d_{ri}$ □r, □i" insert -- $0 \leq \xi_{2ri} \leq d_{ri}$ □r, □i --.

Signed and Sealed this  
Sixteenth Day of July, 2019

Andrei Iancu  
*Director of the United States Patent and Trademark Office*